United States Patent [19]

Peterson et al.

[11] Patent Number: 4,633,815
[45] Date of Patent: Jan. 6, 1987

[54] WATERER CORNER WEAR GUARD

[75] Inventors: Jerry D. Peterson, Conrad, Iowa; Gerald L. Knief, Bay St. Louis, Mo.

[73] Assignee: Ritchie Industries, Inc., Conrad, Iowa

[21] Appl. No.: 770,667

[22] Filed: Aug. 28, 1985

[51] Int. Cl.[4] ............................................. A01K 7/00
[52] U.S. Cl. ........................................ 119/72; 119/73
[58] Field of Search ...................... 119/72, 73, 74, 76, 119/77, 78

[56] References Cited

U.S. PATENT DOCUMENTS

| | | | |
|---|---|---|---|
| 976,874 | 11/1910 | Hasman, Jr. | 119/78 |
| 1,797,996 | 3/1931 | Ouse | 119/72 |
| 3,745,977 | 7/1973 | Martin | 119/73 |

Primary Examiner—Hugh R. Chamblee
Attorney, Agent, or Firm—Jenner & Block

[57] ABSTRACT

An improved corner wear guard that protects water troughs and will not become sharp when exposed to the rubbing motion of large animals, Further, the corner wear guard will not damage an animal's hide. This results in more valuable hides for the leather market. Additionally, the corner wear guard inhibits the formation of loose animal hair contaminants in the water troughs.

5 Claims, 3 Drawing Figures

WATERER CORNER WEAR GUARD

Water is essential to raising healthy domestic animals. In the case of large animals such as cattle, hogs and the like, farmers often install watering devices such as troughs, in animal pens or out in open fields.

But, in addition to providing water, troughs are often used by the animals as convenient scratching posts. Particularly during the cold weather, when the skin becomes dry and itchy, animals seek relief from the itch by "scratching": that is, by rubbing up and down on the corner of a water trough. In the case of cattle, their tremendous size and weight can quickly damage or entirely wear away the corners of a water trough.

In attempts to protect the troughs from this abuse, farmers have attached wear guards to the corners of the troughs to provide reinforcement. The guards themselves, however, can become sharp when exposed to the rubbing motion of large animals. As a result, cattle can damage their hides by scratching on the sharp corners of troughs which reduces the value of the hides in the leather market.

Additionally, hair scraped off while scratching on the corner of a trough often falls into the trough and fouls the drinking water. This can lead to unhealthy animals, and more work and expense for the farmers.

It is accordingly a general object of the present invention to provide an inexpensive, durable wear guard to prevent damage to water troughs.

Another object of the present invention is to provide a wear guard that will not damage an animal's hide even under repeated use as a scratcher.

Still another object is to provide a wear guard that will not become sharp even when rubbed by large animals.

Yet another object is to provide a trough wear guard that, when used for scratching by an animal, reduces the amount of hair scraped from the animal's hide.

Other objects and advantages of the present invention will become apparent upon reading the following detailed description and upon reference to the drawings. Throughout the drawings, like reference numerals refer to like parts.

DETAILED DESCRIPTION

While the invention will be described in connection with several preferred embodiments, it will be understood that it is not intended to limit the invention to these embodiments. On the contrary, it is intended to cover all alternatives, modifications and equivalents as may be included in the spirit and scope of this invention as defined by the appended claims.

Figure 1:
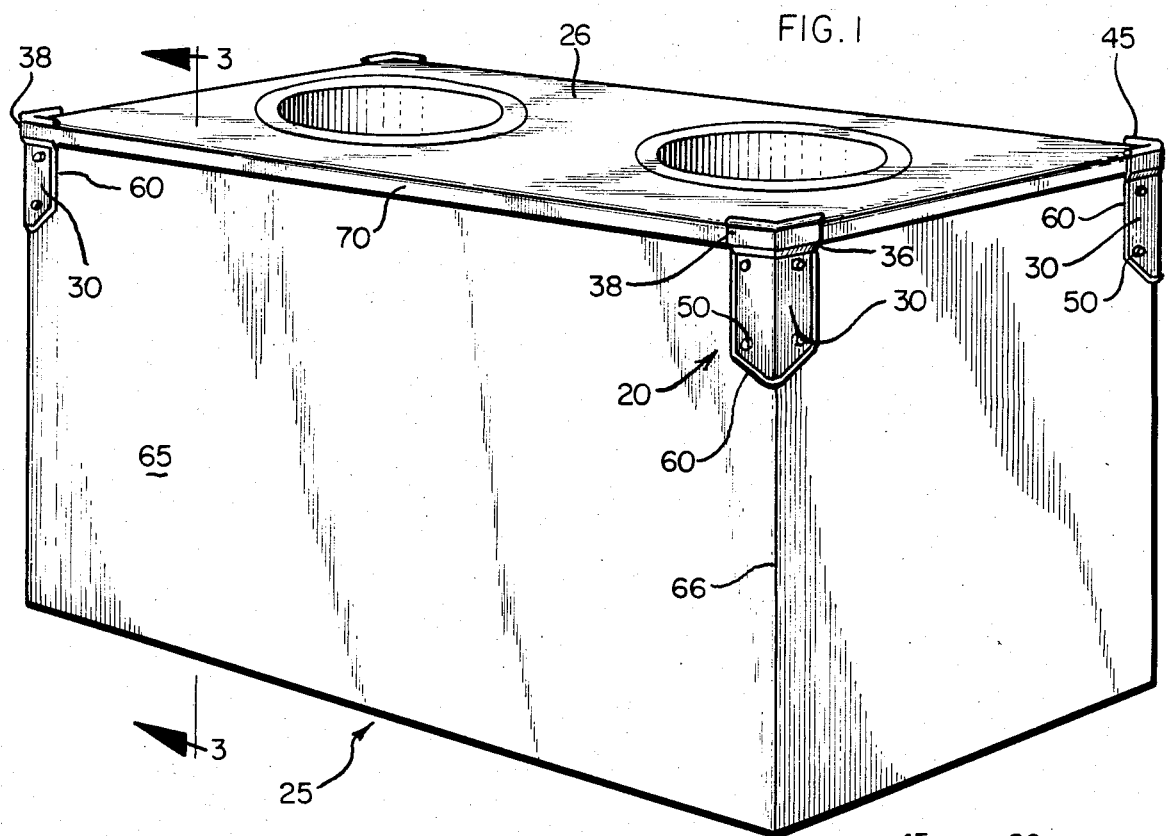
FIG. 1 is a perspective showing the preferred embodiment of a novel wear guard attached to an exemplary water trough.
Figure 2:
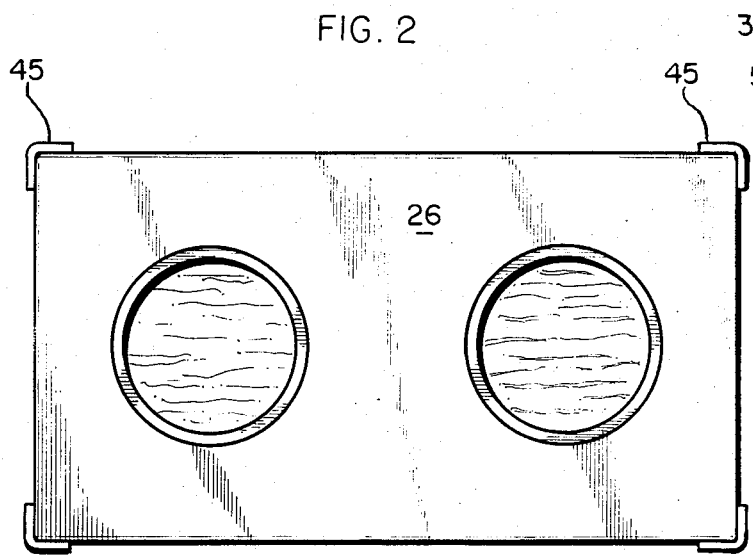
FIG. 2 is a top plan view of the exemplary trough with the novel wear guards attached to each corner.
Figure 3:
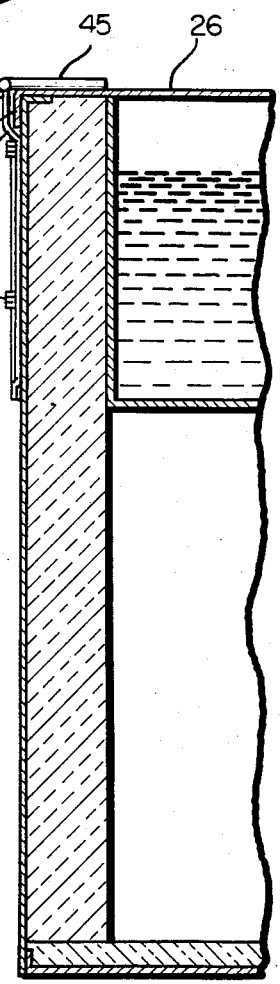
FIG. 3 is a sectional view taken substantially along line 3—3 in FIG. 1.

Turning first to FIG. 1, there is shown a novel wear guard 20 attached to an animal water trough 25 that may have an overlaying cover 26, as illustrated in FIGS. 1-3. In the illustrated embodiment, the wear guard 20 has an elongated v-shaped body member 30 defining substantially a right angle. While the body 30 can be fabricated from any durable material, such as galvanized sheet steel, the preferred embodiment is made of stainless steel.

As will be described, the novel features of this wear guard 20 allow the trough manufacturers to use a lesser gauge of stainless steel that is customary in the art. This leads to a savings in manufacturing costs, both in materials and fabrication.

A shoulder member 36 extends outwardly and upwardly from the body 30. A guard flange 38 integral with the shoulder 36 extends upward to define a top end 40.

It is a feature of the invention that animals rubbing against the corners of the waterer are inhibited from actually touching and damaging the trough corners to any substantial degree. To this end, a rod member 45 substantially covers the top end 40 of the body 30.

In the preferred embodiment, the rod member 45 is of substantially circular cross section which eliminates the sharp edge normally associated with the end of an angle iron. Repeated rubbing against the rod member 45 will wear the rod member 45, but will not sharpen it into a cutting edge. Further, the cross section diameter of the rod is greater than the width of the body member. The rod thus provides greater protection to the animal water by having more material at the point of greatest contact with an animal.

The wear guard 20 may be attached to the vertical corners of a trough 25 by any conventional means. In the preferred embodiment, a bolt 50 in each of four bolt openings 55 (not shown) in the body 30 will securely hold the wear guard 20 to the trough 25. In addtion, the body 30 has an inwardly depressed edge 60 extending downward along the length of the body 30 from a point below the shoulder 38 on either side of the body 30. Having a depressed edge 60 assures secure and positive contact between the animal water trough housing 65 and the body edge 60 when the wear guard is attached to the vertical corner 66. This arrangement inhibits animal hair from becoming lodged between the edge 60 and the housing 65.

When the body 30 is attached to the vertical corner 66, the shoulder 36 spaces the guard flange 38 from the vertical corner 66 itself. This enables a cover 26 having a cover flange 70 of predetermined thickness to be placed on the trough 25. In the preferred embodiment, the guard flange 38 is spaced from the corner 66 by the shoulder 36 so as to accept a press fit of the cover flange 70 between the guard flange 38 and the corner 66. In such an arrangement the guard flange 38 overlies and surrounds the corner of the cover flange 70 in a nesting relationship.

What is claimed is:

1. A wear guard to protect the vertical corners of an animal waterer housing having an overlaying cover, the cover having a cover flange of predetermined thickness, the wear guard comprising, in combination: an elongated V-shaped body member defining substantially a right angle for attachment to the waterer housing, an outwardly and upwardly extending shoulder member, a guard flange integral with the shoulder member extending upwardly to define a top end, a rod of circular cross section forming substantially a right angle and fixed to the top end to present a rounded surface to animals using the waterer; the shoulder member spacing the guard flange from the vertical corner of the animal waterer housing to allow a cover flange corner to fit between the guard flange and the housing corner so that the guard flange overlies and surrounds the corner of the cover flange in a nesting relationship.

2. The wear guard according to claim 1 wherein said guard flange is spaced from said animal waterer housing corner by said shoulder member so as to accept a press fit of said cover flange corner between said guard flange and said housing corner.

3. The wear guard according to claim 1 wherein said rod cross section has a diameter greater than the thickness of the guard flange top end.

4. The wear guard according to claim 1 wherein said V-shaped body member has an inwardly depressed edge extending down along the length of said body from a point below said shoulder member on either side of said body member so that the depressed edge assures secure and positive contact between said animal water housing and said wear guard body edge when the wear guard is attached to said vertical corner.

5. The wear guard of claim 1 wherein said body member has at least one bolt opening to provide a means to bolt said wear guard to said animal waterer housing.

* * * * *